(12) United States Patent
Kurihara

(10) Patent No.: US 12,525,763 B2
(45) Date of Patent: Jan. 13, 2026

(54) FIBER LASER APPARATUS

(71) Applicant: FUJIKURA LTD., Tokyo (JP)

(72) Inventor: Takuya Kurihara, Chiba (JP)

(73) Assignee: Fujikura Ltd., Toyko (JP)

( * ) Notice: Subject to any disclaimer, the term of this patent is extended or adjusted under 35 U.S.C. 154(b) by 741 days.

(21) Appl. No.: 17/799,366

(22) PCT Filed: Jan. 5, 2021

(86) PCT No.: PCT/JP2021/000058
§ 371 (c)(1),
(2) Date: Aug. 12, 2022

(87) PCT Pub. No.: WO2021/181845
PCT Pub. Date: Sep. 16, 2021

(65) Prior Publication Data
US 2023/0059340 A1    Feb. 23, 2023

(30) Foreign Application Priority Data

Mar. 10, 2020 (JP) .................................. 2020-041303

(51) Int. Cl.
*H01S 3/067* (2006.01)
*H01S 3/08018* (2023.01)
*H01S 3/094* (2006.01)

(52) U.S. Cl.
CPC .... *H01S 3/094011* (2013.01); *H01S 3/06704* (2013.01); *H01S 3/08018* (2013.01);
(Continued)

(58) Field of Classification Search
CPC ......... H01S 3/094053; H01S 3/094011; H01S 3/0675; H01S 3/06704
See application file for complete search history.

(56) References Cited

U.S. PATENT DOCUMENTS 7,720,340 B2 * 5/2010 Lewis ............... H01S 3/094003
385/98
7,839,902 B2 * 11/2010 Li ........................ B23K 26/064
372/6

(Continued)

FOREIGN PATENT DOCUMENTS

JP    2012-103513 A    5/2012
JP    2012-215708 A    11/2012
(Continued)

OTHER PUBLICATIONS

Notice of Reasons for Refusal issued in corresponding Japanese Patent Application No. 2022-505789, dated Jun. 27, 2023.

*Primary Examiner* — Tod T Van Roy
(74) *Attorney, Agent, or Firm* — Osha Bergman Watanabe & Burton LLP

(57) ABSTRACT

A fiber laser apparatus includes: an amplification optical fiber that amplifies a laser beam; one or more pumping light sources that generate pumping light that is supplied to the amplification optical fiber; an output optical fiber including a first core that allows the laser beam amplified by the amplification optical fiber to propagate therethrough, and a first cladding having a refractive index lower than a refractive index of the first core and surrounding a circumference of the first core; a delivery fiber including a second core optically coupled to the first core of the output optical fiber, and a second cladding having a refractive index lower than a refractive index of the second core and surrounding a circumference of the second core; and a first housing unit that houses the amplification optical fiber and the output optical fiber therein.

6 Claims, 3 Drawing Sheets

(52) U.S. Cl.
CPC .. *H01S 3/094007* (2013.01); *H01S 3/094053* (2013.01); *H01S 3/0675* (2013.01)

(56) References Cited

U.S. PATENT DOCUMENTS

| | | | |
|---|---|---|---|
| RE44,262 E * | 6/2013 | Gonthier | G02B 6/2821 |
| | | | 385/27 |
| 8,542,971 B2 * | 9/2013 | Chatigny | H01S 3/06704 |
| | | | 385/134 |
| 9,897,759 B2 * | 2/2018 | Botheroyd | H01S 3/094053 |
| 10,396,523 B1 | 8/2019 | Goodno et al. | |
| 10,845,541 B2 * | 11/2020 | Kuniyasu | H01S 3/094007 |
| 10,971,884 B2 * | 4/2021 | Farrow | H01S 3/0675 |
| 10,971,885 B2 * | 4/2021 | Kliner | H01S 5/4012 |
| 2011/0110625 A1 * | 5/2011 | Chatigny | G02B 6/3636 |
| | | | 156/60 |
| 2014/0016656 A1 * | 1/2014 | Taya | H01S 3/06754 |
| | | | 372/6 |
| 2015/0029580 A1 * | 1/2015 | Taya | H01S 3/06783 |
| | | | 359/341.1 |
| 2018/0198252 A1 * | 7/2018 | Kliner | H01S 5/4012 |
| 2019/0058300 A1 | 2/2019 | Ferin et al. | |
| 2020/0067261 A1 * | 2/2020 | Sugiyama | H01S 3/094011 |
| 2023/0059340 A1 * | 2/2023 | Kurihara | H01S 3/06704 |

FOREIGN PATENT DOCUMENTS

| | | | | |
|---|---|---|---|---|
| JP | 2016-186536 A | 10/2016 | | |
| JP | 2017-168772 A | 9/2017 | | |
| JP | 6550494 B1 | 7/2019 | | |
| JP | 2019-158934 A | 9/2019 | | |
| JP | 2019174502 A * | 10/2019 | | |
| WO | WO-2012165389 A1 * | 12/2012 | | B23K 26/06 |
| WO | 2018/207872 A1 | 11/2018 | | |

* cited by examiner

FIBER LASER APPARATUS

TECHNICAL FIELD

The present invention relates to a fiber laser apparatus, and more particularly to a fiber laser apparatus that generates a high-power laser beam using pumping light.

BACKGROUND

Fiber laser apparatuses have frequently been used in recent years to conduct a process such as cutting of a metal material or welding because they have better beam qualities, smaller beam spots, and higher power densities as compared to a carbon dioxide gas laser, which has heretofore been used to cut metal. With such fiber laser apparatuses, pumping light is supplied to an amplification optical fiber including a core to which a rare earth element has been doped. Thus, the pumping light is absorbed to the core of the amplification optical fiber so as to amplify a laser beam. The laser beam amplified by the pumping light supplied to the amplification optical fiber propagates through a delivery fiber, so that it is outputted from an emission end thereof (see, e.g., Patent Literature 1).

In a conventional fiber laser apparatus, an amplification optical fiber and an emission end are housed in different housing units. Therefore, a delivery fiber extending from the amplification optical fiber to the emission end is drawn out of a housing unit where the amplification optical fiber is housed, routed along a desired path, and then introduced to a housing unit where the emission end is provided. Thus, the delivery fiber needs to be arranged in a bent manner under spatial restrictions when it is routed. Because a core of the bent delivery fiber is subject to a lateral pressure, the beam quality of a laser beam propagating through the core may be impaired. Furthermore, the shape of the bent delivery fiber is likely to change, so that the beam quality of the laser beam is unlikely to be stabilized.

PATENT LITERATURE

[Patent Literature 1] JP 2017-168772 A

SUMMARY

One or more embodiments of the present invention provide a fiber laser apparatus that can suppress impairment of a beam quality of an output laser beam and obtain stabilized beam quality.

According to one or more embodiments of the present invention, there is provided a fiber laser apparatus that can suppress impairment of a beam quality of an output laser beam and obtain stabilized beam quality. This fiber laser apparatus includes an amplification optical fiber operable to amplify a laser beam, at least one pumping light source operable to generate pumping light to be supplied to the amplification optical fiber, an output optical fiber including a first core that allows the laser beam amplified by the amplification optical fiber to propagate therethrough and a first cladding having a refractive index lower than a refractive index of the first core, the first cladding surrounding a circumference of the first core, a delivery fiber including a second core optically coupled to the first core of the output optical fiber and a second cladding having a refractive index lower than a refractive index of the second core, the second cladding surrounding a circumference of the second core, and a first housing unit that houses the amplification optical fiber and the output optical fiber therein. The second cladding of the delivery fiber has an outside diameter greater than an outside diameter of the first cladding of the output optical fiber. The delivery fiber extends from an interior of the first housing unit to an exterior of the first housing unit.

DETAILED DESCRIPTION

Figure 1:
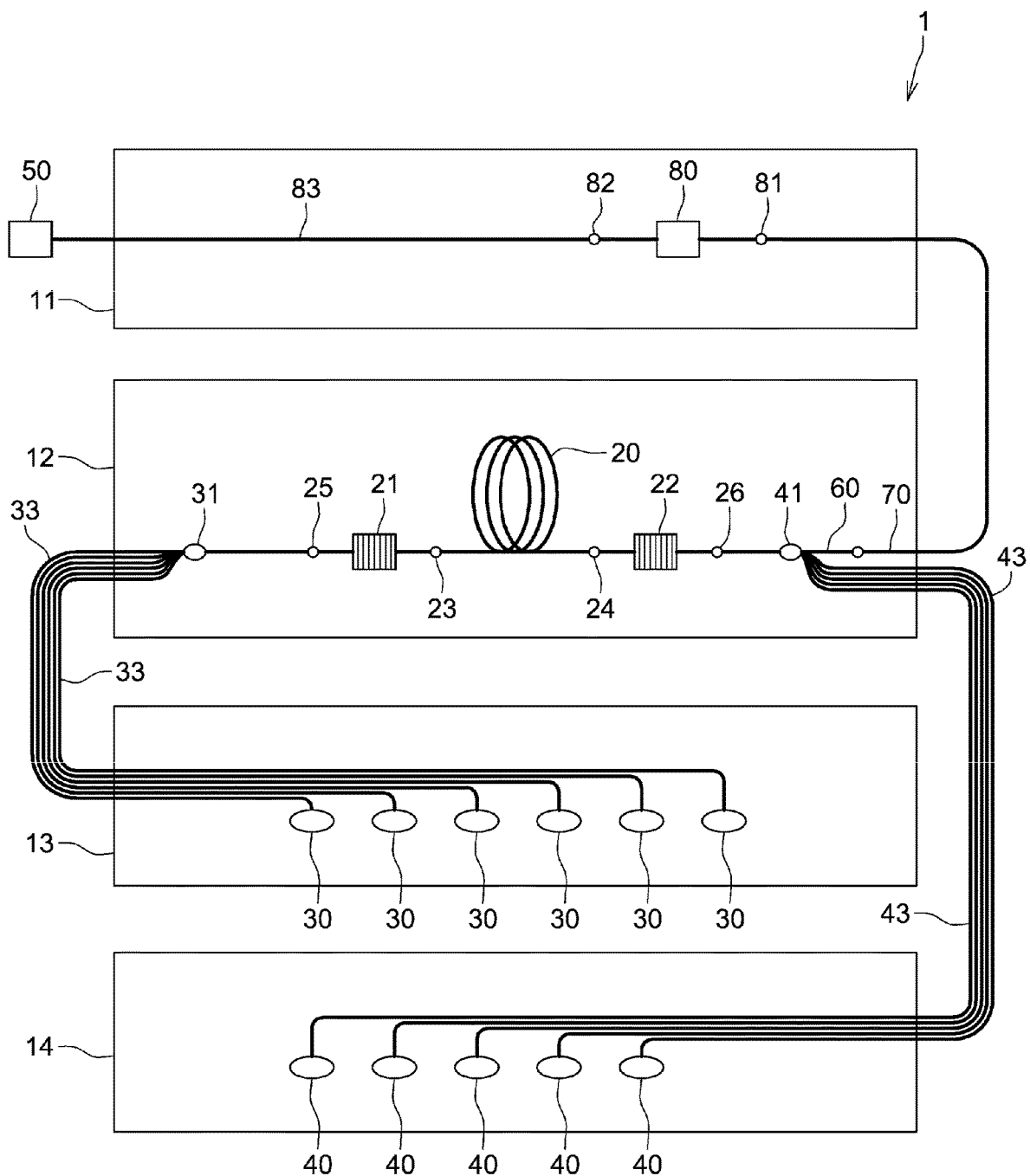
FIG. 1 is a diagram schematically showing an entire arrangement of a fiber laser apparatus according to one or more embodiments of the present invention.

Embodiments of a fiber laser apparatus according to the present invention will be described in detail below with reference to FIGS. 1 to 4. In FIGS. 1 to 4, the same or corresponding components are denoted by the same or corresponding reference numerals and will not be described below repetitively. Furthermore, in FIGS. 1 to 4, the scales or dimensions of components may be exaggerated, or some components may be omitted. Unless mentioned otherwise, in the following description, terms such as "first," "second," etc. are only used to distinguish one component from another and are not used to indicate a specific order or a specific sequence.

FIG. 1 is diagram schematically showing an entire arrangement of a fiber laser apparatus 1 according to one or more embodiments of the present invention. As shown in FIG. 1, the fiber laser apparatus 1 includes a plurality of housing units 11-14 stacked in a vertical direction. In FIG. 1, for easy understanding, those housing units 11-14 are illustrated as being separated from each other. In practice, the housing units 11-14 are vertically stacked in such a manner that they are in contact with each other.

As shown in FIG. 1, the fiber laser apparatus 1 has an amplification optical fiber 20 that can amplify a laser beam, a high-reflectivity portion 21 that reflects light having a certain wavelength range with a high reflectivity, a low-reflectivity portion 22 that reflects light having the aforementioned wavelength range with a reflectivity lower than that of the high-reflectivity portion 21, a plurality of forward pumping light sources 30 operable to supply pumping light to the amplification optical fiber 20 from an end (front side) of the amplification optical fiber 20, a forward optical combiner 31 operable to combine pumping light beams outputted from the forward pumping light sources 30 and introduce the combined pumping light to the amplification optical fiber 20, a plurality of backward pumping light sources 40 operable to supply pumping light to the amplification optical fiber 20 from another end (back side) of the amplification optical fiber 20, a backward optical combiner 41 operable to combine pumping light beams outputted from the backward pumping light sources 40 and introduce the combined pumping light to the amplification optical fiber 20, and a beam emission end 50 that outputs a laser beam amplified by the pumping light supplied to the amplification optical fiber 20. Unless otherwise mentioned herein, the term "downstream" refers to a direction from the amplification optical fiber 20 to the beam emission end 50, and the term "upstream" refers to an opposite direction thereto.

For example, high-power multi-mode semiconductor lasers (LD) having a wavelength of 975 nm may be used for the forward pumping light sources 30 and the backward pumping light sources 40. Laser beams generated by the forward pumping light sources 30 and laser beams generated by the backward pumping light sources 40 may have the same wavelength or different wavelengths. For example, the high-reflectivity portion 21 and the low-reflectivity portion 22 can be formed by fiber Bragg grating, which is formed by periodically varying the refractive index of an optical fiber, or a mirror.

The second housing unit 12 from the top houses therein the amplification optical fiber 20, the high-reflectivity portion 21, the low-reflectivity portion 22, the forward optical combiner 31, and the backward optical combiner 41. Within the housing unit 12, the high-reflectivity portion 21 is connected to the amplification optical fiber 20 at a fusion splice portion 23 and to the forward optical combiner 31 at a fusion splice portion 25. The low-reflectivity portion 22 is connected to the amplification optical fiber 20 at a fusion splice portion 24 and to the backward optical combiner 41 at a fusion splice portion 26.

Figure 2:
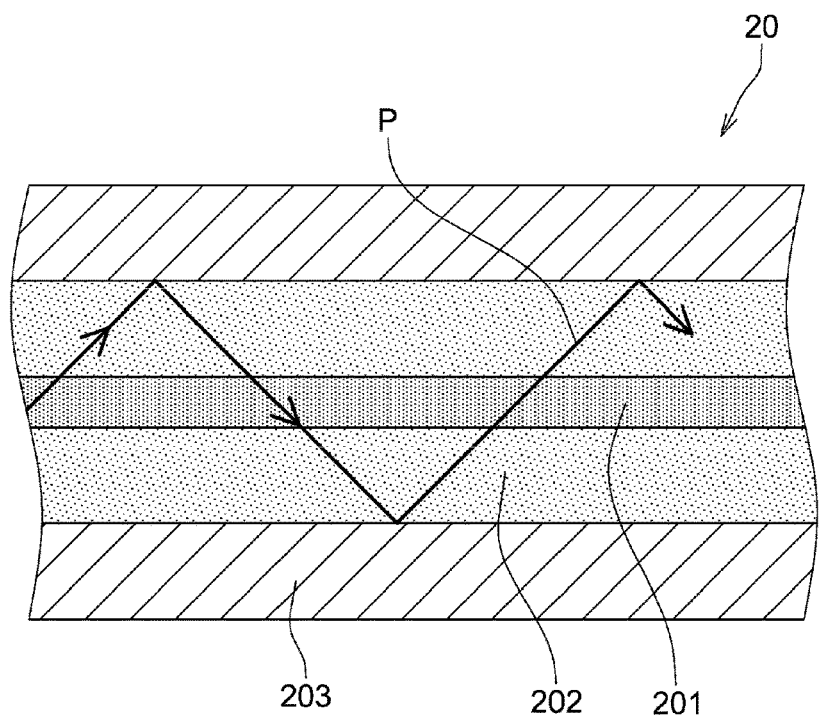
FIG. 2 is a cross-sectional view schematically showing an amplification optical fiber in the fiber laser apparatus illustrated in FIG. 1.

FIG. 2 is a cross-sectional view schematically showing the amplification optical fiber 20. For example, as shown in FIG. 2, the amplification optical fiber 20 is formed of a double cladding fiber. For example, the amplification optical fiber 20 have a core 201 to which a rare earth element such as ytterbium (Yb), erbium (Er), thulium (Tr), or neodymium (Nd) has been doped, an inner cladding 202 formed around the core 201, and an outer cladding 203 formed around the inner cladding 202. The inner cladding 202 is formed of a material having a refractive index lower than a refractive index of the core 201 (e.g., $SiO_2$). Thus, the core 201 serves as a light waveguide through which a laser beam (signal light) propagates. The outer cladding 203 is formed of a resin having a refractive index lower than the refractive index of the inner cladding 202 (e.g., a low refractive index polymer). Thus, the core 201 and the inner cladding 202 serve as a light waveguide through which the pumping light P propagates.

The third housing unit 13 from the top houses therein the forward pumping light sources 30. Forward pumping light fibers 33 extend respectively from the forward pumping light sources 30 of the third housing unit 13 to the forward optical combiner 31 of the second housing unit 12. The lowest housing unit 14 (third housing unit) houses therein the backward pumping light sources 40. Backward pumping light fibers 43 extend respectively from the backward pumping light sources 40 of the lowermost housing unit 14 to the backward optical combiner 41 of the second housing unit 12.

Figure 3:
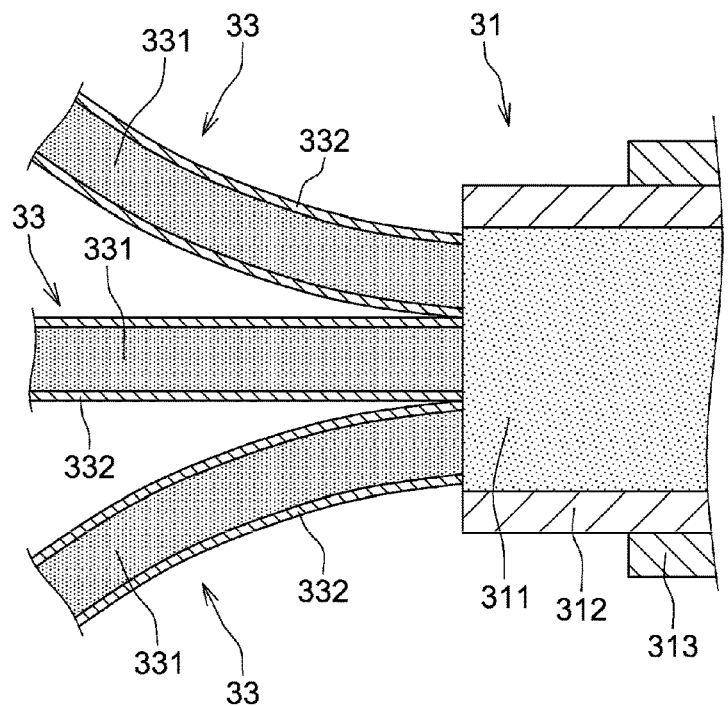
FIG. 3 is a cross-sectional view schematically showing a forward optical combiner and forward pumping light fibers in the fiber laser apparatus illustrated in FIG. 1.

FIG. 3 is a cross-sectional view schematically showing the forward optical combiner 31 and the forward pumping light fibers 33. As shown in FIG. 3, each of the forward pumping light fibers 33 includes a core 331, a cladding 332 surrounding a circumference of the core 331, and a covering (not shown) surrounding a circumference of the cladding 332. The cladding 332 has a refractive index lower than a refractive index of the core 331. Thus, the core 331 of each of the forward pumping light fibers 33 serves as a light waveguide through which the pumping light propagates from the forward pumping light source 30.

The forward optical combiner 31 includes a core 311, a cladding 312 surrounding a circumference of the core 311, and a covering 313 surrounding a circumference of the cladding 312. The cladding 312 has a refractive index lower than a refractive index of the core 311. Thus, the core 311 serves as a light waveguide through which the pumping light propagates. Each of the forward pumping light fibers 33 is connected to the forward optical combiner 31 by fusion splice such that the cores 331 of the forward pumping light fibers 33 are located within an area of the core 311 of the forward optical combiner 31. The coverings of the forward pumping light fibers 33 and the covering 313 of the forward optical combiner 31 are removed near the fusion splice portion between the forward pumping light fibers 33 and the forward optical combiner 31. Thus, pumping light generated by the forward pumping light source 30 propagates through the core 331 of the forward pumping light fiber 33, enters the core 311 of the forward optical combiner 31, and then propagates through the core 311 of the forward optical combiner 31. A layer of air may be formed around the core 311 of the forward optical combiner 31 and used as the cladding 312.

The high-reflectivity portion 21 of one or more embodiments is formed by a double cladding fiber having fiber Bragg grating formed therein. Specifically, the high-reflectivity portion 21 includes a core, an inner cladding surrounding a circumference of the core, and an outer cladding surrounding a circumference of the inner cladding. At the fusion splice portion 25 (see FIG. 1), the core 311 of the forward optical combiner 31 (see FIG. 3) is optically coupled to the inner cladding of the high-reflectivity portion 21. Furthermore, at the fusion splice portion 23 (see FIG. 1), the core 201 of the amplification optical fiber 20 (see FIG. 2) is optically coupled to the core of the high-reflectivity portion 21, and the inner cladding 202 of the amplification optical fiber 20 (see FIG. 2) is optically coupled to the inner cladding of the high-reflectivity portion 21.

Figure 4:
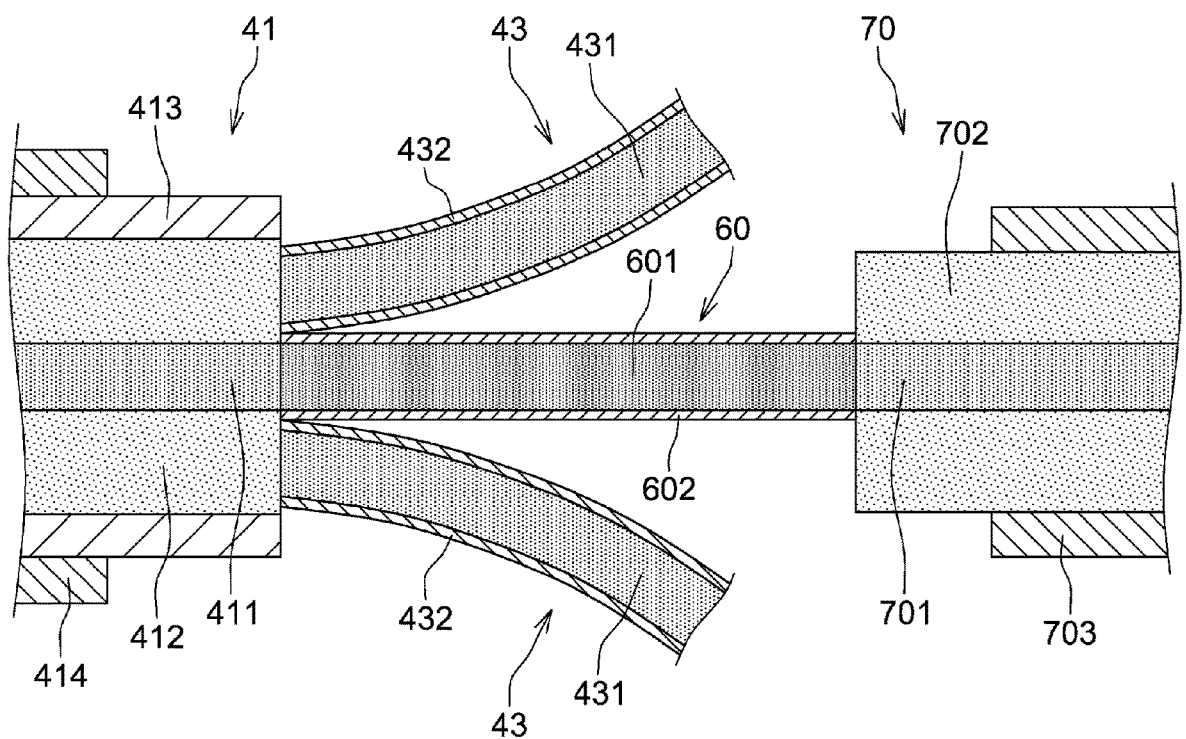
FIG. 4 is a cross-sectional view schematically showing a backward optical combiner and backward pumping light fibers in the fiber laser apparatus illustrated in FIG. 1.

FIG. 4 is a cross-sectional view schematically showing the backward optical combiner 41 and the backward pumping light fibers 43. As shown in FIG. 4, each of the backward pumping light fibers 43 includes a core 431, a cladding 432 surrounding a circumference of the core 431, and a covering (not shown) surrounding a circumference of the cladding 432. The cladding 432 has a refractive index lower than a refractive index of the core 431. Thus, the core 431 of each of the backward pumping light fibers 43 serves as a light waveguide through which the pumping light propagates from the backward pumping light source 40.

The backward optical combiner 41 includes a core 411, an inner cladding 412 surrounding a circumference of the core 411, an outer cladding 413 surrounding a circumference of the inner cladding 412, and a covering 414 surrounding a circumference of the outer cladding 413. The inner cladding 412 has a refractive index lower than a refractive index of the core 411. Thus, the core 411 serves as a light waveguide through which the signal light propagates. Furthermore, the outer cladding 413 has a refractive index lower than the refractive index of the inner cladding 412. Thus, the core 411 and the inner cladding 412 serve as a light waveguide through which the pumping light propagates. Each of the backward pumping light fibers 43 is connected to the backward optical combiner 41 by fusion splice such that the cores 431 of the backward pumping light fibers 43 are located within an area of the inner cladding 412 of the backward optical combiner 41. The coverings of the backward pumping light fibers 43 and the covering 414 of the backward optical combiner 41 are removed near the fusion splice portion between the backward pumping light fibers 43 and the backward optical combiner 41. A layer of air may be formed around the inner cladding 412 of the backward optical combiner 41 and used as the outer cladding 413.

The low-reflectivity portion 22 of one or more embodiments is formed by a double cladding fiber having fiber Bragg grating formed therein. Specifically, the low-reflectivity portion 22 includes a core, an inner cladding surrounding a circumference of the core, and an outer cladding surrounding a circumference of the inner cladding. At the fusion splice portion 26 (see FIG. 1), the core 411 of the backward optical combiner 41 (see FIG. 4) is optically coupled to the core of the low-reflectivity portion 22, and the inner cladding 412 of the backward optical combiner 41 is optically coupled to the inner cladding of the low-reflectivity portion 22. Furthermore, at the fusion splice portion 24 (see FIG. 1), the core 201 of the amplification optical fiber 20 (see FIG. 2) is optically coupled to the core of the low-reflectivity portion 22, and the inner cladding 202 of the amplification optical fiber 20 (see FIG. 2) is optically coupled to the inner cladding of the low-reflectivity portion 22.

As shown in FIG. 4, an output optical fiber 60 is connected to a central region of an end face of the backward optical combiner 41. The output optical fiber 60 includes a core 601 (first core) and a cladding 602 (first cladding) surrounding a circumference of the core 601. The cladding 602 has a refractive index lower than a refractive index of the core 601. Thus, the core 601 serves as a light waveguide through which the signal light propagates. For example, the core 601 of the output optical fiber 60 has an outside diameter of 40 µm, and the cladding 602 has an outside diameter of 125 µm. The output optical fiber 60 is connected to the backward optical combiner 41 by fusion splice such that the core 411 of the backward optical combiner 41 is located within an area of the core 601 of the output optical fiber 60. The output optical fiber 60 is housed along with the backward optical combiner 41 in the housing unit 12 (see FIG. 1).

As shown in FIG. 4, a delivery fiber 70 is connected to an end of the output optical fiber 60. The delivery fiber 70 includes a core 701 (second core) and a cladding 702 (second cladding) surrounding a circumference of the core 701, and a covering 703 surrounding a circumference of the cladding 702. The cladding 702 has a refractive index lower than a refractive index of the core 701. Thus, the core 701 serves as a light waveguide through which the signal light propagates. For example, the core 701 of the delivery fiber 70 has an outside diameter of 40 µm, and the cladding 702 has an outside diameter of 400 µm. The delivery fiber 70 is connected to the output optical fiber 60 by fusion splice such that the core 601 of the output optical fiber 60 is located within an area of the core 701 of the delivery fiber 70. The covering 703 of the delivery fiber 70 is removed near the fusion splice portion between the output optical fiber 60 and the delivery fiber 70.

An end of the delivery fiber 70 that is closer to the output optical fiber 60 is housed in the housing unit 12 (first housing unit). The delivery fiber 70 extends from the housing unit 12 to an exterior of the housing unit 12. The delivery fiber 70 is routed along a predetermined path and introduced into the housing unit 11 (second housing unit). In order to reduce a damage to the delivery fiber 70, a portion of the delivery fiber 70 that is located outside of the housing units 11 and 12 may have the covering 703.

The housing unit 11 houses therein a cladding mode stripper 80 as a cladding mode removal portion that removes cladding mode light. An end of the delivery fiber 70 that has been introduced to the housing unit 11 is connected to the cladding mode stripper 80 at a fusion splice portion 81. Various types of any known cladding mode removal structure may be used for the cladding mode stripper 80. This cladding mode stripper 80 removes unnecessary cladding mode light that propagates through the cladding 702 of the delivery fiber 70. The cladding mode stripper 80 is connected to an optical fiber 83 at a fusion splice portion 82 within the housing unit 11. The optical fiber 83 extends to the beam emission end 50.

With this configuration, pumping light generated by each of the forward pumping light sources 30 propagates through the core 331 of the forward pumping light fiber 33 and enters the core 311 of the forward optical combiner 31. The pumping light that has entered the core 311 of the forward optical combiner 31 passes through the high-reflectivity portion 21 and enters the inner cladding 202 of the amplification optical fiber 20. Furthermore, pumping light generated by each of the backward pumping light sources 40 propagates through the core 431 of the backward pumping light fiber 43 and enters the inner cladding 412 of the backward optical combiner 41. The pumping light that has entered the inner cladding 412 of the backward optical combiner 41 passes through the low-reflectivity portion 22 and enters the inner cladding 202 of the amplification optical fiber 20.

As shown in FIG. 2, the pumping light P that has entered the amplification optical fiber 20 from the forward pumping light sources 30 and the backward pumping light sources 40 propagates through the inner cladding 202 and the core 201 of the amplification optical fiber 20. The pumping light P is absorbed to rare earth ions while it passes across the core 201, so that the rare earth ions are excited to produce spontaneous emission. The spontaneous emission is recursively reflected between the high-reflectivity portion 21 and the low-reflectivity portion 22, so that light having a specific wavelength (e.g., 1064 nm) is amplified to cause laser oscillation. The laser beam thus amplified (signal light) propagates through the core 201 of the amplification optical fiber 20. A portion of the signal light transmits through the low-reflectivity portion 22, then propagates through the core 411 of the backward optical combiner 41, propagates through the core 601 of the output optical fiber 60, and enters the core 701 of the delivery fiber 70. This signal light propagates through the core 701 of the delivery fiber 70 and reaches the cladding mode stripper 80 in the housing unit 11. After unnecessary cladding mode light is removed by the cladding mode stripper, the signal light is emitted from the beam emission end 50, for example, toward a workpiece.

In order to reduce loss of the signal light, the outside diameter of the core 701 of the delivery fiber 70 (for example, 40 µm) may be equal to the outside diameter of the core 601 of the output optical fiber 60 (for example, 40 µm). The outside diameter of the cladding 702 of the delivery fiber 70 (for example, 400 µm) is greater than the outside diameter of the cladding 602 of the output optical fiber 60 (for example, 125 µm). The cladding 702 may have an outside diameter that is not less than 4 times and not more than 25 times, not less than 5 times and not more than 14 times the outside diameter of the core 701 of the delivery fiber 70, or have an outside diameter that is about ten times the outside diameter of the core 701 of the delivery fiber 70. Furthermore, for routing the delivery fiber 70, the cladding 702 of the delivery fiber 70 may have an outside diameter that is not more than 1 mm.

Generally, as a cladding of an optical fiber has a greater outside diameter, the beam quality is less impaired by the bending of the optical fiber. In one or more embodiments, the cladding 702 of the delivery fiber 70 has an outside diameter that is greater than the outside diameter of the cladding 602 of the output optical fiber 60. Therefore, even if the delivery fiber 70 is arranged outside of the housing unit 12 in a bent manner, impairment of the beam quality of a laser beam propagating through the core 701 of the delivery fiber 70 is suppressed so that the beam quality is stabilized.

Particularly, the fiber laser apparatus 1 of one or more embodiments includes the backward optical combiner 41. A plurality of backward pumping light fibers 43 are connected to the backward optical combiner 41 in addition to the output optical fiber 60. Thus, the outside diameter of the cladding 602 of the output optical fiber 60 is smaller than that of the inner cladding 412 of the backward optical combiner 41. Therefore, when the output optical fiber 60 is connected to the delivery fiber 70 including the cladding 702 having a large outside diameter as described above, impairment of the beam quality of a laser beam propagating through the core 701 of the delivery fiber 70 can effectively be suppressed.

Furthermore, in one or more embodiments, the delivery fiber 70 extends from the housing unit 12 to the housing unit 11. Therefore, the delivery fiber 70 tends to be bent at many locations between the housing unit 12 and the housing unit 11. Particularly, when the housing unit 11 and the housing unit 12 are stacked in a vertical direction as in one or more embodiments, the delivery fiber 70 needs to be bent and routed. Even if the delivery fiber 70 is arranged in a bent manner between the housing unit 12 and the housing unit 11, impairment of the beam quality of a laser beam propagating through the core 701 of the delivery fiber 70 can be suppressed because the outside diameter of the cladding 702 of the delivery fiber 70 is greater than the outside diameter of the cladding 602 of the output optical fiber 60. Moreover, even if any disturbance such as vibration is caused by maintenance or movement of the apparatus, the beam quality is unlikely to vary so as to provide a structure that is less susceptible to disturbance because the outside diameter of the cladding 702 of the delivery fiber 70 is greater than the outside diameter of the cladding 602 of the output optical fiber 60.

As in none or more embodiments, when the housing units 11-14 are stacked in a vertical direction, a footprint of the housing units 11-14 can be reduced. Additionally, since the housing units 11-14 are stacked adjacent to each other in the vertical direction, those housing units 11-14 can be maintained more readily, for example, by arranging the housing units 11-14 in a drawable manner within a frame. It has been known that stimulated Raman scattering can be reduced by shortening a length of an optical fiber. When the housing unit 11 and the housing unit 12 are arranged adjacent to each other as in one or more embodiments, a length of an optical fiber from the output optical fiber 60 to the cladding mode stripper 80 can be shortened so that stimulated Raman scattering can be reduced.

The aforementioned housing units 11-14 may be cooled by separate cooling systems. With such a configuration, components housed in the respective housing units 11-14 can be cooled independently of each other. Therefore, variations of optical characteristics due to temperature changes of those components can effectively be reduced. Thus, the efficiency of the fiber laser apparatus can also be improved.

The fiber laser apparatus 1 of one or more embodiments includes the multiple backward pumping light sources 40 and the backward optical combiner 41. Nevertheless, the backward pumping light sources 40 and the backward optical combiner 41 may be omitted. In such a case, the low-reflectivity portion 22 and the output optical fiber 60 are connected to each other.

In the illustrated example, the housing units 11-14 are stacked in a vertical direction. As a matter of course, however, the housing units 11-14 may be stacked in a horizontal direction.

As a fiber laser apparatus, there has been known a MOPA fiber laser apparatus that amplifies seed light from a seed light source with use of pumping light from a pumping light source. The present invention is also applicable to such a MOPA fiber laser apparatus.

Although some embodiments of the present invention have been described, the present invention is not limited to the aforementioned embodiments. It should be understood that various different forms may be applied to the present invention within the technical idea thereof.

As described above, according to one or more embodiments of the present invention, there is provided a fiber laser apparatus that can suppress impairment of a beam quality of an output laser beam and obtain stabilized beam quality. This fiber laser apparatus includes an amplification optical fiber operable to amplify a laser beam, at least one pumping light source operable to generate pumping light to be supplied to the amplification optical fiber, an output optical fiber including a first core that allows the laser beam amplified by the amplification optical fiber to propagate therethrough and a first cladding having a refractive index lower than a refractive index of the first core, the first cladding surrounding a circumference of the first core, a delivery fiber including a second core optically coupled to the first core of the output optical fiber and a second cladding having a refractive index lower than a refractive index of the second core, the second cladding surrounding a circumference of the second core, and a first housing unit that houses the amplification optical fiber and the output optical fiber therein. The second cladding of the delivery fiber has an outside diameter greater than an outside diameter of the first cladding of the output optical fiber. The delivery fiber extends from an interior of the first housing unit to an exterior of the first housing unit.

According to one or more embodiments of the present invention, an outside diameter of the second cladding of the delivery fiber is greater than an outside diameter of the first cladding of the output optical fiber. Therefore, even if the delivery fiber is arranged outside of the first housing unit in a bent manner, impairment of the beam quality of a laser beam propagating through the second core of the delivery fiber is suppressed so that the beam quality is stabilized.

The fiber laser apparatus may further include a second housing unit that houses therein a cladding mode removal portion to remove a cladding mode. The second housing unit is provided separately from the first housing unit. The delivery fiber may extend from the interior of the first housing unit to the exterior of the first housing unit and connect to the cladding mode removal portion of the second housing unit. With this configuration, the delivery fiber tends to be bent at many locations between the first housing unit and the second housing unit. As described above, even if the delivery fiber is arranged between the first housing unit and the second housing unit in a bent manner, impairment of the beam quality of a laser beam propagating through the second core of the delivery fiber is suppressed so that the beam quality is stabilized.

In this case, the first housing unit and the second housing unit may be disposed adjacent to each other. It has been known that stimulated Raman scattering can be reduced by shortening a length of an optical fiber. When the first housing unit and the second housing unit are arranged adjacent to each other, a length of an optical fiber from the output optical fiber to the cladding mode removal portion can be shortened so that stimulated Raman scattering can be reduced.

Furthermore, the second housing unit may be disposed adjacent to the first housing unit above or below the first housing unit. When the first housing unit and the second housing unit are disposed adjacent to each other in a vertical direction, those housing units can be maintained more readily, for example, by arranging the housing units in a drawable manner within a frame.

The at least one pumping light source may include a plurality of backward pumping light sources provided downstream of the amplification optical fiber. The fiber laser apparatus may further include a plurality of backward pumping light fibers that allow the pumping light generated by the plurality of backward pumping light sources to propagate therethrough and a backward optical combiner operable to combine pumping light beams generated by the plurality of backward pumping light sources and introduce the combined pumping light to the amplification optical fiber. The backward optical combiner has an end face to which the plurality of backward pumping light sources and the output optical fiber are optically coupled. With this configuration, a plurality of backward pumping light fibers are connected to the backward optical combiner in addition to the output optical fiber. Thus, the outside diameter of the first cladding of the output optical fiber is smaller than that of an optical fiber located upstream of the backward optical combiner. Therefore, when the output optical fiber is connected to the delivery fiber including the second cladding having a large outside diameter as described above, impairment of the beam quality of a laser beam propagating through the second core of the delivery fiber can effectively be suppressed.

The fiber laser apparatus may further include a third housing unit that houses the at least one pumping light source therein. The third housing unit is provided separately from the first housing unit. The first housing unit and the third housing unit may be disposed adjacent to each other. The third housing unit may be provided separately from the second housing unit. With this configuration, the first housing unit and the third housing unit can be cooled by separate cooling systems. Therefore, the amplification optical fiber and the output optical fiber housed in the first housing unit and the pumping light source housed in the third housing unit can be cooled independently of each other. Therefore, variations of optical characteristics due to temperature changes of those components can effectively be reduced. Thus, the efficiency of the fiber laser apparatus can also be improved.

According to one or more embodiments of the present invention, an outside diameter of the second cladding of the delivery fiber is greater than an outside diameter of the first cladding of the output optical fiber. Therefore, even if the delivery fiber is arranged outside of the first housing unit in a bent manner, impairment of the beam quality of a laser beam propagating through the second core of the delivery fiber is suppressed.

This application claims the benefit of priority from Japanese patent application No. 2020-041303, filed on Mar. 10, 2020, the disclosure of which is incorporated herein in its entirety by reference.

The present invention may be used for a fiber laser apparatus that generates a high-power laser beam using pumping light.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Fiber laser apparatus
11 (Second) housing unit
12 (First) housing unit
13 (Third) housing unit
14 (Third) housing unit
20 Amplification optical fiber
21 High-reflectivity portion
22 Low-reflectivity portion
30 Forward pumping light source
31 Forward optical combiner
33 Forward pumping light fiber
40 Backward pumping light source
41 Backward optical combiner
43 Backward pumping light fiber
50 Beam emission end
60 Output optical fiber
70 Delivery fiber
80 Cladding mode stripper (cladding mode removal portion)
201, 311, 331, 411, 431 Core
202, 412 Inner cladding
203, 413 Outer cladding
312, 332, 432 Cladding
601 (First) core
602 (First) cladding
701 (Second) core
702 (Second) cladding

The invention claimed is:
1. A fiber laser apparatus comprising:
an amplification optical fiber that amplifies a laser beam;
one or more pumping light sources that generate pumping light that is supplied to the amplification optical fiber;
an output optical fiber comprising:
 a first core that allows the laser beam amplified by the amplification optical fiber to propagate therethrough; and
 a first cladding having a refractive index lower than a refractive index of the first core and surrounding a circumference of the first core;
a delivery fiber comprising:
 a second core optically coupled to the first core of the output optical fiber; and
 a second cladding having a refractive index lower than a refractive index of the second core and surrounding a circumference of the second core; and
a first housing unit that houses the amplification optical fiber and the output optical fiber therein;
a cladding mode removal portion that removes a cladding mode; and
a second housing unit that houses the cladding mode removal portion and that is disposed separately from the first housing unit, wherein
the second cladding has an outside diameter greater than an outside diameter of the first cladding, and the delivery fiber extends from an interior of the first housing unit to an exterior of the first housing unit and further to the cladding mode removal portion in the second housing unit.

2. The fiber laser apparatus according to claim 1, wherein the first housing unit is disposed adjacent to the second housing unit.

3. The fiber laser apparatus according to claim 2, wherein the second housing unit is disposed above or below the first housing unit.

4. The fiber laser apparatus according to claim 1, wherein
the fiber laser apparatus comprises a plurality of the pumping light sources, including backward pumping light sources disposed downstream of the amplification optical fiber, and
the fiber laser apparatus further comprises:
backward pumping light fibers that allow the pumping light generated by the backward pumping light sources to propagate therethrough; and
a backward optical combiner that:
combines pumping light beams generated by the backward pumping light sources, and
introduces a combined pumping light to the amplification optical fiber, wherein
the backward optical combiner has an end face to which the backward pumping light sources and the output optical fiber are optically coupled.

5. The fiber laser apparatus according to claim 1, further comprising a third housing unit that houses the one or more pumping light sources therein that is disposed separately from the first housing unit.

6. The fiber laser apparatus according to claim 5, wherein the first housing unit is disposed adjacent to the third housing unit.

* * * * *